US006477467B1

(12) United States Patent
Sitton et al.

(10) Patent No.: US 6,477,467 B1
(45) Date of Patent: Nov. 5, 2002

(54) EFFICIENT INVERSION OF NEAR SINGULAR GEOPHYSICAL SIGNALS

(75) Inventors: Gary A. Sitton; Zelijko Jericevic, both of Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,335

(22) Filed: Jan. 14, 2000

Related U.S. Application Data

(63) Continuation-in-part of application No. 09/115,307, filed on Jul. 14, 1998, now Pat. No. 6,038,197.

(51) Int. Cl.$^7$ ................................................. G06F 7/38
(52) U.S. Cl. ................................................. 702/2; 703/8
(58) Field of Search .................. 367/24, 73; 702/2, 702/189; 708/403, 402; 342/378; 703/8

(56) References Cited

U.S. PATENT DOCUMENTS

| | | | | |
|---|---|---|---|---|
| 3,629,800 A | | 12/1971 | Schneider | 340/15.5 |
| 4,760,563 A | * | 7/1988 | Beylkin | 367/73 |
| 5,253,192 A | * | 10/1993 | Tufts | 708/403 |
| 5,587,965 A | | 12/1996 | Dragoset, Jr. et al. | 367/24 |
| 5,629,882 A | * | 5/1997 | Iwata | 708/402 |
| 5,864,786 A | | 1/1999 | Jeričević | 702/189 |
| 5,986,973 A | | 11/1999 | Jeričević et al. | 367/24 |
| 6,038,197 A | * | 3/2000 | Sitton et al. | 367/38 |
| 6,091,361 A | * | 7/2000 | Davis et al. | 342/378 |

OTHER PUBLICATIONS

L.R. Lines and S. Treitel, *Tutorial:A Review of Least--Squares Inversion and its Application to Geophysical Problems*, 1984, Geophysical Prospecting, pp. 159–186.

Sven Treitel and L. R. Lines, *Linear inverse theory and deconvolution*, Aug. 1982, vol. 47, No. 8, pp. 1153–1159.

\* cited by examiner

*Primary Examiner*—Edward Lefkowitz
*Assistant Examiner*—Victor J. Taylor
(74) *Attorney, Agent, or Firm*—David S. Figatner; Madan, Mossman & Sriram, P.C.

(57) ABSTRACT

In a method for inverting a seismic signal, an input seismic signal is represented as an input vector i(t) of length m+n−1, an output seismic signal is represented as an output vector o(t) of length m, and a finite impulse response filter is represented as a solution vector u(t) of length n, satisfying a convolutional equation i(t)⊗u(t)=o(t). An m×, n Toeplitz matrix T(t,τ) corresponding to i(t) is calculated, satisfying a matrix equation T(t,τ)·u(t)=o(t). Both sides of the matrix equation are transformed to a transform domain, to generate a transformed equation. Both sides of the transformed equation are pruned, to generate a pruned equation. The pruned equation is then solved. In one embodiment of the invention, the transformed domain is the frequency domain.

21 Claims, 4 Drawing Sheets

$$T = \begin{bmatrix} i(n-1) & i(n-2) & i(n-3) & \cdots & i(2) & i(1) & i(0) \\ i(n) & i(n-1) & i(n-2) & \cdots & i(3) & i(2) & i(1) \\ i(n+1) & i(n) & i(n-1) & \cdots & i(4) & i(3) & i(2) \\ \vdots & \vdots & \vdots & & \vdots & \vdots & \vdots \\ i(n+m-4) & i(n+m-5) & i(n+m-5) & \cdots & i(m-1) & i(m-2) & i(m-3) \\ i(n+m-3) & i(n+m-4) & i(n+m-4) & \cdots & (m) & i(m-1) & i(m-2) \\ i(n+m-2) & i(n+m-3) & i(n+m-3) & \cdots & i(m+1) & i(m) & i(m-1) \end{bmatrix}$$

FIG. 1

$$T = \begin{bmatrix} i(n-1) & 0 & 0 & \cdots & 0 & 0 & 0 \\ i(n) & i(n-1) & 0 & \cdots & 0 & 0 & 0 \\ i(n+1) & i(n) & i(n-1) & \cdots & 0 & 0 & 0 \\ \vdots & \vdots & \vdots & & \vdots & \vdots & \vdots \\ i(2n-4) & i(2n-5) & i(2n-6) & \cdots & i(n-1) & 0 & 0 \\ i(2n-3) & i(2n-4) & i(2n-5) & \cdots & i(n) & i(n-1) & 0 \\ i(2n-2) & i(2n-3) & i(2n-4) & \cdots & i(n+1) & i(n) & i(n-1) \\ \vdots & \vdots & \vdots & & \vdots & \vdots & \vdots \\ i(m-1) & i(m-2) & i(m-3) & \cdots & i(m-n+2) & i(m-n+1) & i(m-n) \\ 0 & i(m-1) & i(m-2) & \cdots & i(m-n+3) & i(m-n+2) & i(m-n+1) \\ 0 & 0 & i(m-1) & \cdots & I(m-n+4) & I(m-n+3) & I(m-n+2) \\ \vdots & \vdots & \vdots & & \vdots & \vdots & \vdots \\ 0 & 0 & 0 & \cdots & i(m-1) & i(m-2) & i(m-3) \\ 0 & 0 & 0 & \cdots & 0 & i(m-1) & i(m-2) \\ 0 & 0 & 0 & \cdots & 0 & 0 & i(m-1) \end{bmatrix}$$

FIG. 2

EFFICIENT INVERSION OF NEAR SINGULAR GEOPHYSICAL SIGNALS

This application is a continuation-in-part of U.S. patent application Ser. No. 09/115,307 filed on Jul. 14, 1998 now U.S. Pat. No. 6,038,197.

BACKGROUND OF THE INVENTION

1. Field of the Invention

The present invention relates generally to seismic signal processing and, more particularly, to a method for efficient inversion of near singular geophysical signals.

2. Description of the Related Art

A common data processing activity in exploration geophysics is inverting geophysical signals. This can arise in Wiener filtering in its various forms, for example, deconvolution, cross equalization, adaptive filtering and echo cancellation. Such signals are characterized by a convolutional equation system and inverting the signals are all variations on the convolutional model least squares problem. These problems are discussed in Treitel, S. and Lines, L. R., "Linear Inverse Theory and Deconvolution" Geophysics, vol. 47, p p. 1153–1159, 1982 and in Lines, L. R. and Treitel, S., "Tutorial: A Review of Least-Squares Inversion and its Applications to Geophysical Problems", Geophysical Prospecting, Vol. 32, pp.159–186, 1984. For geophysical signals, the corresponding systems are often near singular (ill-conditioned) or rank-deficient. Classic methods for inverting such systems require stabilization methods such as adding white random noise, using a γ damping factor, spectral shaping or constraint, or other so-called regularization methods. For the convolutional model, this is usually done in the normal equation form using Levinson recursion on the Toeplitz autocorrelation matrix, as will be explained below.

In this class of problems, one is given an input signal $i(t)$, an output signal $o(t)$ and a finite impulse response filter $u(t)$ having the relationship:

$$i(t) = i \otimes u(t) = o(t) \quad (1)$$

Here the symbol $\otimes$ indicates convolution and the vectors i, u and o are each functions of time t. It is typically desired to find the particular solution filter or wavelet $\hat{u}(t)$ which which gives the minimum error $e(t)$ in the least squares sense. The solution to the least squares minimization problem is found by first defining the error vector by $$e(t) = i(t) \otimes \hat{u}(t) - o(t) \quad (2)$$

and then minimizing the mean squared scalar error $\epsilon$ defined by the inner product of the error vector e from Eq. (2) with itself $$\epsilon = e^H \cdot e. \quad (3)$$

Here the superscript $^H$ indicates the Hermetian transpose operator or complex conjugate, and the dot · indicates the vector inner product.

For a filter vector $u(t)$ of length n and an output vector $o(t)$ of length m in Eq. (1), the input vector $i(t)$ will be of length m+n−1. Convolution of the input vector i with filter vector u may be represented by multiplication of u by an m×n matrix T, where T is the Toeplitz matrix defined by $$T(t,\tau) = i(n-\tau+t-1) \quad (4)$$

for $t=0, \ldots m+n-2$ and $\tau=0, \ldots n-1$. FIG. 1 shows the matrix T. Eq. (4) allows Eq. (1) to be rewritten in matrix form as $$T \cdot u = o \quad (5)$$

Eq. (5) is known as the direct form equations of the least squares problem. In geophysical signal processing, the number of data observations, represented by rows m, is usually larger than the number of physical parameters, represented by columns n. Thus the direct form equations, Eq. (5), are typically a system of m overdetermined equations.

The least squares solution $\hat{u}$ may be found from the normal form equations, an exactly determined Toeplitz n×n system $$(T^H \cdot T) \cdot \hat{u} = T^H \cdot o \quad (6)$$

Eq.(6) is Hermetian Toeplitz if $i(j)=0$ for $j=0 \ldots, n-2$ and $j=m, \ldots, m+n-2$. This is shown in FIG. 2, which indicates a column circular matrix. FIG. 1 then represents the transient-free case, while FIG. 2 represents the more typical fully-windowed case.

Eq. (6) is typically simply written as $$A \cdot \hat{u} = c \quad (7)$$

where $A = T^H \cdot T$ is the n×n autocorrelation or Gram matrix and $c = T^H \cdot o$ is the n×1 cross-correlation vector. The typical method for solving Eq. (7) has been Levinson recursion, which will solve an n×n Toeplitz system proportional to $n^2$ multiply-add steps, that is, has order $O(n^2)$ computational complexity. The computations of matrix A and vector c will then add another (m+1)−n steps to these calculations.

The convolutional model least squares problems encountered in geophysical signal processing are often ill-conditioned. A measure of the condition of a matrix T is the condition number cond(T). The condition number of a matrix T is defined as the ratio of the largest to the smallest singular values $\sigma(i)$ in the singular value decomposition of T or the square root of the ratio of the largest to the smallest eigenvalues $\lambda(i)$ in the eigenvalue decomposition of the corresponding Gram matrix A. Thus $$\mathrm{cond}(T^H \cdot T) = \mathrm{cond}(T)^2 = \mathrm{cond}(A) = (\sigma_{max}/\sigma_{min})^2 = \lambda_{max}/\lambda_{min} \quad (8)$$

where $\sigma_{max}$=maximum singular value of T, $\sigma_{min}$=minimum singular value of T, $\lambda_{max}$=maximum eigenvalue of A, and $\lambda_{min}$=minimum eigenvalue of A.

Thus the normal form equations given in Eqs. (6) and (7) have a condition number which is the square of the condition number of the direct form equations of Eq. (5).

Matrices with larger condition numbers are more difficult to accurately invert. This suggests that it would be advantageous to solve the direct form of the least squares problem in Eq. (5) without resorting to conversion to the less well-conditioned normal form of Eqs. (6) and (7). This is usually done by using any number of matrix decomposition techniques, all of which are $O(m \cdot n^2)$ in computational complexity. The advantage to the normal form equation approach for Toeplitz systems is reduced computations at the expense of numerical stability.

The matrix A is defined as singular if $\lambda_{min}=0$, and as nearly singular or ill-conditioned if $|\lambda_{min}|<\delta$, for an appropriately selected small $\delta$. The eigenvalues of Gram matrices are nonnegative. For a practical lower limit, one may choose $\delta = n \cdot \lambda_{max} \cdot \mathrm{eps}$ where eps is the limit of relative floating point accuracy on the computer used. For IEEE standard 754 double precision floating point arithmetic, $\mathrm{eps}=2^{-52} \approx 10^{-16}$. The maximum conditioning number defining illconditioning, $c_{max}$, may be estimated by substituting $|\lambda_{min}|<\delta$ into Eq. (8), yielding $c_{max}=1/(n\cdot eps)$. Then a nearly singular or ill-conditioned system is defined by $cond(A)>c_{max}$.

For a well-conditioned matrix A, a least squares solution û to Eq. (7) is typically found with a matrix decomposition technique such as QR or LU matrix decomposition. The ill-conditioned matrix case, where $cond(A)>c_{max}$, may be solved using singular value decomposition. The rank-deficient case may also be solved by the singular value decomposition approach. Another approach for an ill-conditioned matrix A is to use a small damping factor satisfying $\gamma<<|\lambda_{max}|$ and $\delta<\gamma<|\lambda_{min}|$. This leads to solving the new system $$(A+\gamma \cdot I)\cdot \hat{u}=c \qquad (9)$$

where I is the identity matrix. The singular value decomposition is the stablest approach, but also the slowest approach.

In geophysical applications, the spectral content of the input signal i(t) is often characterized by regions of low amplitude caused by natural shaping, filtering, and noise or reverberation. Such spectral gaps or notches make spectral inversion very difficult without resorting to stabilization methods such as adding white random noise, using a γ damping factor as in Eq.(9), spectral shaping or constraint, or other so-called regularization methods. The solutions, wavelets, obtained by traditional methods are often ill-behaved and as well may not give useful results. Whereas using methods such as singular value decomposition lead to excellent results, they are generally too computationally expensive to be used in most situations.

U.S. Pat. No. 5,864,786 to Jericevic and having the same assignee as the present invention, describes a method of spectral pruning to solve linear systems representing physical systems. However, that application does not take advantage of using the corresponding Toeplitz matrix or solving the corresponding normal form equations to deal with ill-conditioned systems.

SUMMARY OF THE INVENTION

The present invention is a method for inverting a near singular geophysical signal. First, an input seismic signal is represented as an input vector i(t) of length m+n−1, an output seismic signal is represented as an output vector o(t) of length m, and a finite impulse response filter is represented as a solution vector u(t) of length n, satisfying a convolutional equation $i(t) \otimes u(t)=o(t)$. Next an m×n Toeplitz matrix T (t,τ) corresponding to i(t) is calculated, satisfying a matrix equation T (t,τ)·u(t)=o(t). Both sides of the matrix equation are transformed to the frequency domain, to generate a transformed equation. Then, both sides of the transformed equation are spectrally pruned, to generate a pruned equation. Finally the pruned equation is solved.

BRIEF DESCRIPTION OF THE DRAWINGS

A better understanding of the benefits and advantages of the present invention may be obtained from the appended detailed description and drawing figures, wherein:

FIG. 1 is a diagram of the Toeplitz matrix for the transient-free case;

FIG. 2 is a diagram of the Toeplitz matrix for the fully windowed case;

DESCRIPTION OF THE PREFERRED EMBODIMENTS

Figure 3:
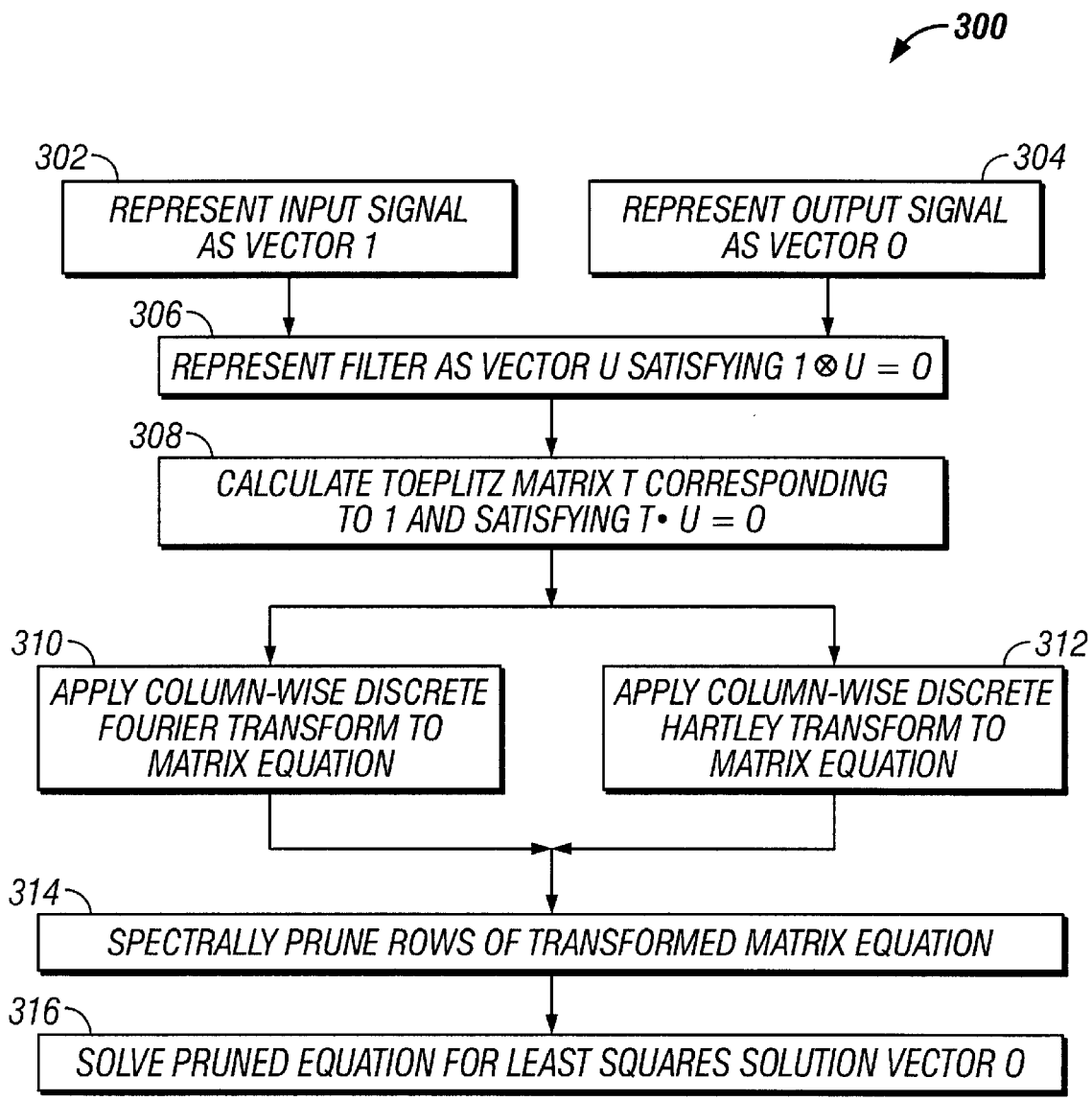
FIG. 3 is a schematic diagram of the first embodiment of the present invention.

The present invention describes a new process for inverting near singular geophysical signals. This inversion process allows the reduction of both the number of equations and the number of variables. This is done by converting the system of linear real equations in time into equations in a transform domain. In one embodiment of the invention, the transform domain is a frequency domain. The transformation into the frequency domain is followed by spectrally pruning the Fourier coefficients in the frequency domain to obtain an approximate but better conditioned system. The frequency domain form may be efficiently computed using fast Fourier transforms. This reduced in size but possibly more stable system may then be solved very efficiently in the direct form with any simple linear equation solver or decomposition technique. The present invention allows singular value decomposition to be effectively used at lower cost, and even allows using other less expensive methods such as QR or LU matrix decompositions as an alternative to Levinson recursion applied to the more poorly conditioned normal equations given in Eqs. (6) and (7).

A preliminary consideration is the effect of the Fourier transform on the solution to the inversion problem. Any unitary matrix transformation amounts to an invertible length-preserving rotation in vector space. As such, the transformation may be applied to both sides of a matrix equation without effecting the solution to the equation. Any such transformation W will always have the orthogonality property $$W^H \cdot W = I \qquad (10)$$

Thus from Eq. (8), W will have a unit condition number cond(W)=1. One such unitary transformation is the normalized discrete Fourier transform. Letting $i=(-1)^{1/2}$, the imaginary unit, the normalized discrete Fourier transform is given by the complex N×N matrix W defined by $$W(k,j)=e^{-i(2\pi kj)}/N^{1/2}=[\cos((2\pi kj)/n)-i\,\sin((2\pi kj)/n)]/N^{1/2} \qquad (11)$$

for j,k=0,1, . . . ,N−1.

Letting N=m and applying this transform as an m×m matrix to both sides of Eq. (5) yields $$W \cdot T \cdot u = W \cdot o \qquad (12)$$

Eq. (12) can then be written as $$\{T\} \cdot u = \{o\}, \qquad (13)$$

where the curly bracket { } notation indicates the column-wise discrete Fourier transform. Note that Eq. (13) has the same solution, the column vector u, as the direct form equations, Eq. (5).

For the case in which T is real, the complication of dealing with a set of complex equations can be eliminated by converting Fourier domain equations into the real Hartley transform domain. The normalized discrete Hartley transform is defined by the real Hartley N×N matrix $$H(k,j)=[\cos((2\pi kj)/N)+\sin((2\pi kj)/N)]/N^{1/2} \quad (14)$$

for j,k=0,1, . . . ,N−1.
From Eq. (11), Eq. (14) is equivalent to $$H=\Re\{W\}-\Im\{W\} \quad (15)$$

that is, the real part of the discrete Fourier transform matrix W minus the imaginary part. Thus a complex discrete Fourier transform of a real input signal may be easily converted to a real discrete Hartley transform. This is done by subtracting the imaginary part from the real part of the discrete Fourier transform. As before, letting N=m and applying this transform as an m×m matrix to both sides of Eq. (5) yields $$H \cdot T \cdot u = H \cdot o \quad (16)$$

Eq. (16) can be written as $$[T] \cdot u = [o] \quad (17)$$

where the square bracket [ ] notation indicates the column-wise discrete Hartley transform. Eq. (17) also has the same solution as Eq. (5), since the Hartley matrix H is also unitary.

Due to the nature of geophysical signal gathering, the columns of T and thus the columns of {T} should be very similar, especially for m>>n. Each length m column in T is a circularly shifted version of every other column with the exception of n−1 contiguous points. These end pieces can all be made the same by setting them all to zeros. This would be the fully-windowed case, as discussed above in relation to FIG. 2, and would have a Toeplitz matrix with zeros in the upper and lower triangular sections. This would also require that n/2−1 zeros be added to the output vector o at each end.

An additional computational advantage occurs for the fully windowed case in which the columns of T are time shifted versions of each other. Here, only one discrete Fourier transform or fast Fourier transform for efficiency, need be done, since $$\{T(\tau+t)\}(k)=\{T(\tau)\}(k) \cdot W(k,j) \quad (18)$$

where {T(τ)}(k) is the $k^{th}$ Fourier coefficient in column τ of matrix {T}. Thus, by starting with {T(0)}, all the remaining columns of {T} may be derived by adding an appropriate phase rotation to each successive column. This requires m complex multiplies for each of the remaining n−1 columns in addition to the m/2 $\log_2$ (m) complex multiply-adds for a radix-2 fast Fourier transform.

This m×n system may now be spectrally pruned by removing rows, corresponding to equations, from both sides which have relatively small spectral magnitudes. This is due to the disproportionate influence of large coefficient values in the least squares solution. Extremely small spectral values in the larger Toeplitz systems are analogous to small singular values and tend to raise the condition number of the matrix. Thus spectral pruning simultaneously reduces the size of the matrix while also improving the condition number of the matrix.

The spectral pruning of {T} can be done in several ways which generally first require the computation of a measure of the amplitude spectra of each row. Appropriate row measures include average magnitude, average power and maximum value. The preferred row measure is the average power, because of the nature of the least squares process. One may now prune all rows in {T} and in {o} which have average powers below a given threshold value δ relative to the maximum row power. Let this pruned set of discrete Fourier transform equations be represented as $$\{T^-\} \cdot u = \{o^-\} \quad (19)$$

where the superscript $^-$ notation indicates a pruned subset of q<m complex equations with n unknowns.

If a Hartley conversion is being done, it is preferred to postpone the Hartley conversion until after the spectral pruning is done, since the Hartley coefficient magnitudes do not reflect spectral power in the same way as do the Fourier coefficient magnitudes. one should spectrally prune the discrete Fourier transform by selecting both coefficients in a conjugate symmetric pair, that is, indices k and n−k, as each will have the same magnitude. This will assure a better balance to the final real system of equations. The Nyquist coefficients, that is, k=n/2 f or n even, and the constant (d. c.) coefficient, that is, k=0, in the discrete Fourier transform of any real signal have no conjugate partners and can be pruned by themselves, if necessary.

The final representation then is the spectrally pruned discrete Hartley transform of an overdetermined system $$[T^-] \cdot u = [o^-] \quad (20)$$

The Fourier to Hartley conversion is only advantageous if the original least squares system is real. If the original least squares system is complex, then the spectrally pruned Fourier system given by Eq. (19) is appropriate. In either case, Eqs. (19) or (20), the final pruned system with m>q≧n must now be solved. Levinson recursion is no longer an option if q=m, since then neither {T$^-$} nor [T$^{31}$ ] will have Toeplitz symmetry. For input signals with extremely sparse spectral data, that is, having a large proportion of zero coefficients, it may be possible to actually reduce the number of equations down to the number of unknowns. In general, however, the pruned system is a smaller overdetermined system which may still be ill-conditioned. Since the spectral pruning process is basically removing irrelevant equations (rows) and leaving the number of unknowns (columns) intact, the condition number of the matrix will not generally be improved.

Let the spectrally pruned Hartley transformed system of Eq. 20 be rewritten as $$P \cdot u = p, \quad (21)$$

where P=[T$^-$] and p=[o$^-$]. In the general case of a system with a well-conditioned m×n matrix P, the least squares solution û to Eq. (21) is typically found using QR matrix decomposition. The QR decomposition is described in general in Golub, G. H. and Van Loan, C. F., *Matrix Computations*, 3rd Ed., The John Hopkins University Press, Baltimore, 1996, and in particular for Toeplitz matrices in Bojanczyk, A. W., Brent, R. P. and de Hoog, F. R., "QR Factorization of Toeplitz Matrices", *Numer. Math.*, No. 49, pp. 81–94, 1986 and in Nagy, J. G., "Fast Inverse QR Factorization for Toeplitz Matrices", *SIAM J. Sci. Comp.*, Vol 14, pp. 1174–1193, 1993.

First the matrix P is decomposed as a product of a m×n unitary matrix Q and an upper triangular n×n matrix R such that $$P = Q \cdot R \quad (22)$$

Next, substituting Eq. (22) into the normal form, Eq. (7), and reducing gives $$(R^H Q^H) \cdot (Q \cdot R) \cdot \hat{u} = (R^H \cdot Q^H) \cdot p \quad (23)$$

or $$R \cdot \hat{u} = Q^H p \quad (24)$$

Eq. (23) is then solved for û by back substitution.

The case of a system with an ill-conditioned matrix, where cond(P)>$c_{max}$, is typically solved in double precision using singular value decomposition. Here, P is decomposed into a m×n unitary matrix U, an n×n diagonal matrix Σ of positive singular values σ(i), and another n×n unitary matrix V such that $$P = U \cdot \Sigma \cdot V^H \quad (24)$$

Again, substituting Eq. (24) into the normal form, Eq. (7) and reducing gives $$(V \cdot \Sigma^H \cdot U) \cdot (U \cdot \Sigma \cdot V^H) \cdot u = p^H \cdot p$$

or $$\hat{u} = (V/\Sigma^2) \cdot V^H \cdot p^H \cdot p \quad (25)$$

Eq. (25) is the efficient outer product form of the overdetermined singular value decomposition solution. This solution form is not only efficient to evaluate, but also does not require the computation of the U matrix from the singular value decomposition. It is one example of how linear systems may be solved by singular value decomposition.

In an alternate embodiment of the invention, equation (22) is solved to give a solution for û without converting to the normal form given by equation (7).

The singular value decomposition approach can also be used to handle the rank-deficient case. This is the case in which one or more singular values σ(i) from the diagonal matrix Σ in the decomposition of matrix P given by Eq. (24) are zero or near zero. This is done by replacing all extremely large or infinite values on the diagonal of $1/\Sigma^2$ in Eq. (25) by zeros. This type of regularization using singular value decomposition results in a minimum $L_2$ norm solution. Thus, not only is the $L_2$ norm of the error Σ from Eq. (3) minimized—the usual least squares condition—but also the $L_2$ norm of û is minimized. This bounded solution generally eliminates erratic or noisy wavelet solutions typical of other regularization methods. Such bounded solutions are not only cosmetically more appealing, but also make more numerically stable deconvolution operators. Therefore, when possible, the Hartley transformed, spectrally pruned and singular value decomposition solution of the Wiener filtering problem is preferred when permitted by the absence of computation time limitations. The singular value decomposition is the best approach, but also the slowest approach, as it requires $0(mn^2)$ computations.

FIG. 3 shows a schematic diagram of a first embodiment of the present invention. The first method is generally designated as 300. In block 302, the input signal is represented as an input vector of length m+n−1. In block 304, an output seismic signal is represented as an output vector o(t) of length m. In block 306, a finite impulse response filter is represented as a solution vector u(t) of length n satisfying the convolutional equation i(t)⊗u(t)=o(t) for the input vector i(t) from block 302 and the output vector o(t) from block 304. In block 308, an m×n Toeplitz matrix T(t,τ) corresponding to i(t) from block 302 is calculated, satisfying the matrix equation T(t,τ)·u(t)=o(t) is calculated. Next, both is sides of the matrix equation from block 308 are transformed from the time domain to the frequency domain. Where the matrix equation is complex, then the transformation is preferably done by applying a column-wise discrete Fourier transform to the Toeplitz matrix T(t,τ) and to the output vector o(t), as in block 310. Where the matrix equation is real, the transformation is preferably done by applying a column-wise discrete Hartley transform to the Toeplitz matrix T(t,τ) and to the output vector o(t), as in block 312. In block 314, both sides of the transformed equation from either block 310 or block 312 are spectrally pruned. Preferably, the spectral pruning is applied to corresponding rows on both sides of the transformed equations. In block 316, the resulting pruned matrix equation from block 314 is solved for the least squares solution vector û(t). Where the pruned matrix equation is a well-conditioned system, it is preferably solved by QR matrix decomposition and back substitution. Where the pruned matrix equation is an ill-conditioned system, it is preferably solved by singular value decomposition. Where the pruned matrix equation is an rank-deficient system, it is preferably solved by singular value decomposition after replacing all extremely large or infinite values on the diagonal of $1/\Sigma^2$ in Eq. (25) by zeros.

The preferred embodiment of the present invention is a yet more efficient but still effective approach to solving the ill-conditioned geophysical convolutional problem. This approach involves the reduction of the number of variables n to match the rank of the problem. This was essentially the method used in the singular value decomposition approach, but is accomplished by different means. Given the final Hartley pruned overdetermined and rank deficient problem as given in Eq. (21), the equation may be rewritten as $$P \cdot (W^H \cdot W) \cdot u = p \quad (26)$$

since, from Eq. (10), $W^H \cdot W = 1$. Regrouping and applying some matrix algebra yields a new Fourier system $$(W^H \cdot p^H)^H \cdot (W \cdot u) = p$$

or $$\{P^H\}^H \cdot \{u\} = p \quad (27)$$

Here $\{P^H\}^H$ is the row-wise discrete Fourier transform of the matrix P and {u} is the discrete column-wise Fourier transform of the solution vector u.

If the system P in Eq. (21) has rank r<n, then $\{P^H\}^H$ in Eq. (27) will contain n−r columns whose average power is zero or very small relative to the remaining columns. These r columns are a linear combination of the remaining columns and correspond to excess variables in the system. Pruning these small columns is equivalent to eliminating variables from the set of equations such that the remaining set is well-conditioned or full-rank. Thus, from Eq. (27), the doubly-pruned q×r system would be represented as $$\{P^{H-}\}^H \cdot \{u^-\} = p \quad (28)$$

Eq. (28) may now be solved for {u⁻} by any standard means, for example, QR decomposition and back substitution. In order to get the desired full-rank solution {û} the deleted coefficients in {u⁻} are first filled in with zeros to give {û}. Then the inverse normalized discrete Fourier transform is applied to {û}. Finally $$\hat{u} = W^H \cdot \{\hat{u}\} \quad (29)$$

is computed.

When dealing with a purely real problem, or just as a convenience, Eq. (28) may be converted from a complex system into a real system by again converting to a Hartley transform. Using the previously established convention, this would yield $$[P^{H-}]^H \cdot [u^-] = p \quad (30)$$

The solution [u⁻] is left in the Hartley domain. Thus an inverse Hartley transform, which is identical to the forward Hartley transform, may be used. Alternatively the solution may be converted back into the Fourier domain and then a fast Fourier transform may be applied. This latter step, or $[\cdot]\rightarrow\{\cdot\}$, may be done if the original signal was real. This is because the discrete Fourier transform will have conjugate symmetry, that is, for the $k^{th}$ coefficient of a length n discrete Fourier transform of the $j^{th}$ column $$\{\cdot\}(n-k-1,j)=\{\Re\{\cdot\}(k,j)\}-\{\Im\{\cdot\}(k,j)\} \quad (31)$$

Eq. (16) then implies that $$\Re\{\{\cdot\}(k,j)\}=[[\cdot](k,j)+[\cdot](n-k,j)]/2 \quad (32)$$

and $$\Im\{\{\cdot\}(k,j)\}=-[[\cdot](k,j)-[\cdot](n-k,j)]/2 \quad (33)$$

for k=0, ..., n−1. Eqs. (32) and (33) show how to convert from the Hartley domain to the Fourier domain.

Figure 4:
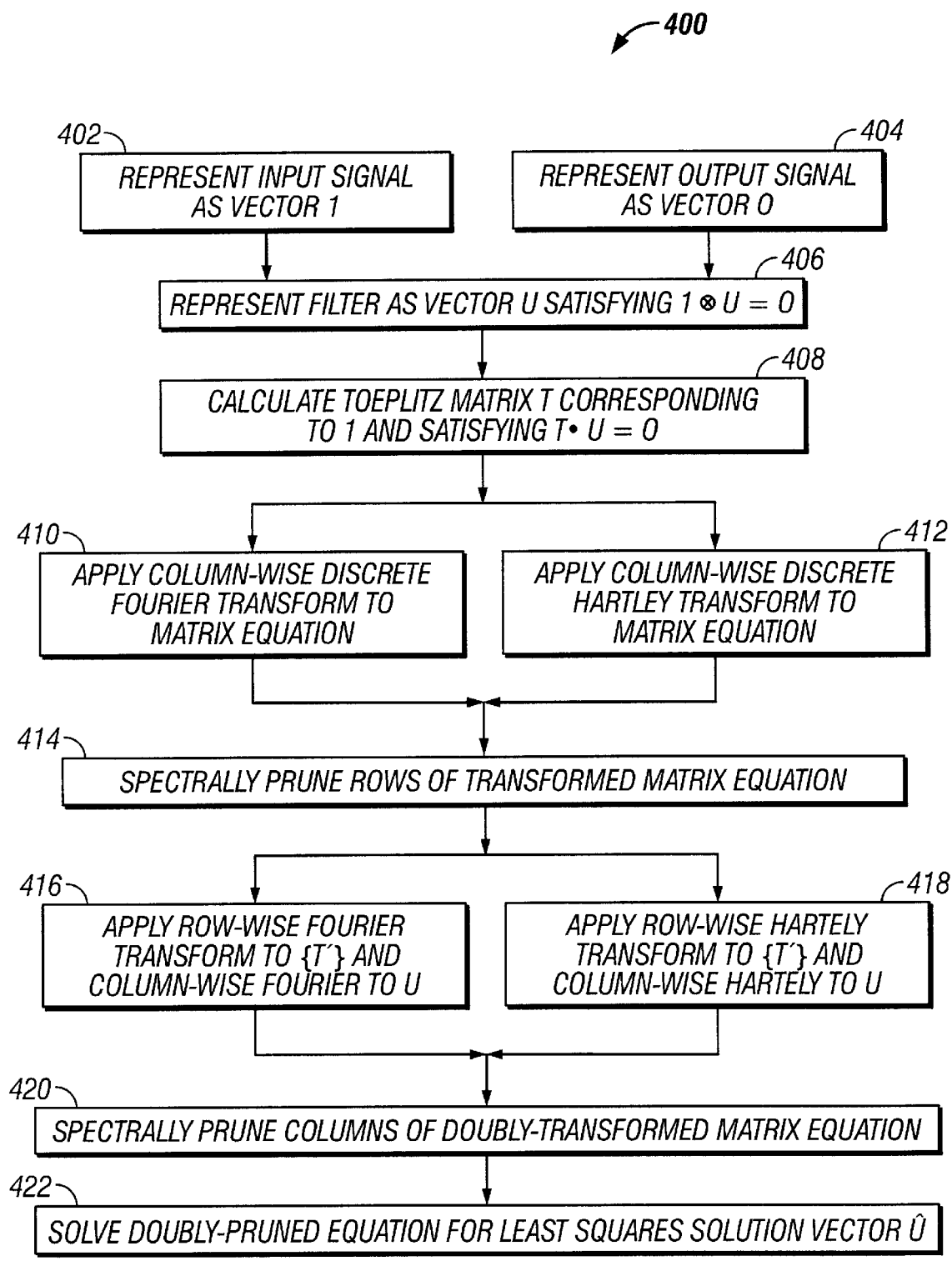
FIG. 4 is a schematic diagram of the preferred embodiment of the present invention.

FIG. 4 shows a schematic diagram of the preferred method of the present invention. The preferred method is generally designated as 400. In block 402, the input signal is represented as an input vector of length m+n−1. In block 404, an output seismicsignal is represented as an output vector o(t) of length m. In block 406, a finite impulse response filter is represented as a solution vector u(t) of length n satisfying the convolutional equation i(t)⊗u(t)=o(t) for the input vector i(t) from block 402 and the output vector o(t) from block 404. In block 408, the m×n Toeplitz matrix T(t,τ) corresponding to i(t) from block 402 is calculated, satisfying the matrix equation T(t,τ)·u(t)=o(t). Next, both sides of the matrix equation from block 408 are transformed to the frequency domain. Where the matrix equation is complex, the transformation is preferably done by applying a column-wise discrete Fourier transform to the Toeplitz matrix T(t,τ) and to the output vector o(t), as in block 410. Where the matrix equation is real, the transformation is preferably done by applying a column-wise discrete Hartley transform to the Toeplitz matrix T(t,τ) and to the output vector o(t), as in block 412. In block 414, both sides of the transformed equation from either block 410 or block 412 are spectrally pruned. Preferably, the spectral pruning is applied to corresponding rows on both sides of the transformed equations.

Next, a second transform is applied to the pruned matrix equation from block 414. The second transformation is preferably done by applying a row-wise discrete Fourier transform to the pruned transformed Toeplitz matrix {T⁻} and a column-wise discrete, Fourier transform to the filter vector u(t), as in block 416. Alternatively, the second transformation may be done by applying a row-wise discrete Hartley transform to the pruned transformed Toeplitz matrix T(t,τ) and a column-wise discrete Hartley transform to the filter vector u(t), as in block 418. In block 420, both sides of the doubly-transformed equation from either block 416 or block 418 are spectrally pruned. Preferably, the spectral pruning is applied to corresponding columns on both sides of the transformed equations. Finally, in block 422, the resulting doubly-pruned matrix equation from block 420 is solved for the least squares solution vector û(t). Two methods for this solution are described in the discussion of FIGS. 5 and 6 below, depending upon whether a Fourier or Hartley transform was used in blocks 416 or 418, respectively, above.

Figure 5:
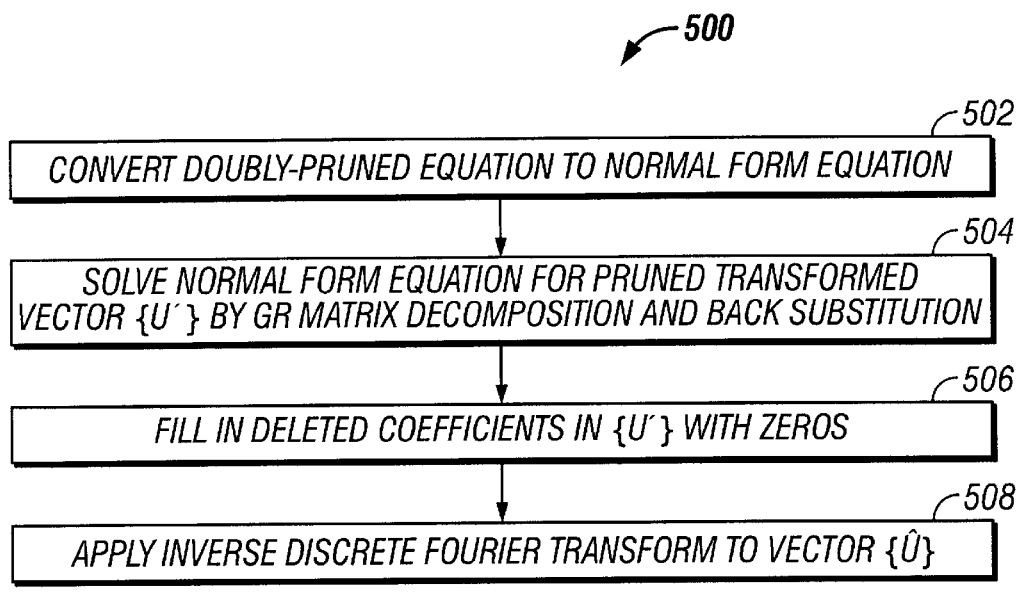
FIG. 5 is a schematic diagram of the preferred method of solving the doubly-pruned matrix equation in the case that a Fourier transform was used.

FIG. 5 shows a schematic diagram of the preferred method of solving the doubly-pruned matrix equation as in block 422 of FIG. 4 in the case that a Fourier transform was applied in block 416 of FIG. 4. This solution method is generally designated as 500. In block 502, the doubly-pruned matrix equation from block 420 of FIG. 4 is converted to the normal form equation. In block 504, the normal form equation from block 502 is solved for the pruned solution vector $\{u^-\}$. As the doubly-pruned matrix equation is a well-conditioned system, it is preferably solved by QR matrix decomposition and back substitution. In block 506, the deleted coefficients in the pruned solution vector $\{u^-\}$ from block 504 are filled in with zeros to give a filled-in solution vector $\{û\}$. Then, in block 508, the inverse normalized discrete Fourier transform $^{-1}$is applied to the filled-in solution vector $\{û\}$ from block 506. This yields the least squares solution vector û(t).

Figure 6:
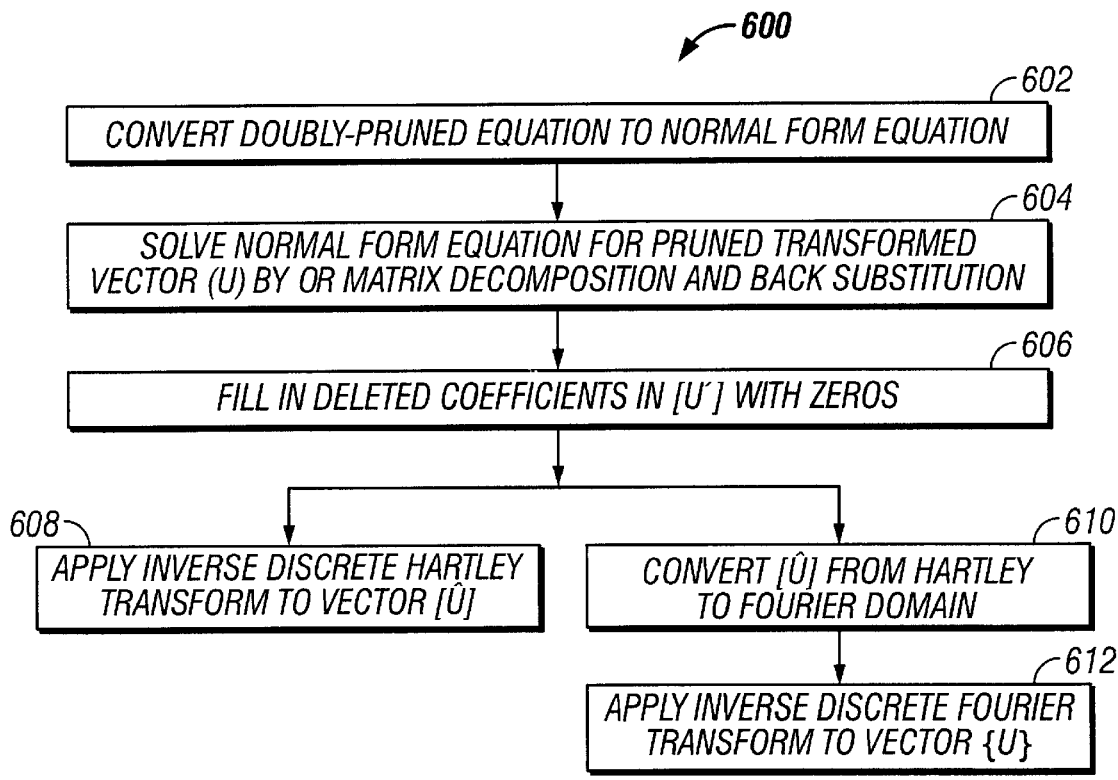
FIG. 6 is a schematic diagram of an alternative method of solving the doubly-pruned matrix equation in the case that a Hartley transform was used.

FIG. 6 shows a schematic diagram of an alternative method of solving the doubly-pruned matrix equation as in block 422 of FIG. 4 in the case that a Hartley transform was applied in block 418 of FIG. 4. This alternative solution method is generally designated as 600. In block 602, the doubly-pruned matrix equation from block 420 of FIG. 4 is converted to the normal form equation. In block 604, the normal form equation from block 602 is solved for the pruned solution vector $[u^-]$. As the doubly-pruned matrix equation is a well-conditioned system, it is preferably solved by QR matrix decomposition and back substitution. In block 606, the deleted coefficient in the pruned solution vector $[u^-]$ from block 604 are filled in with zeros to give the filled-in solution vector $[û]$. Next, an inverse transform is applied to the filled-in solution vector $[û]$ from block 606. Preferably, as in block 608, the inverse transform is the inverse normalized discrete Hartley transform. Alternatively, if the original signal was real instead of complex, then, in block 610, the filled-in solution vector $[û]$ from block 606 is converted from the Hartley domain to the Fourier domain, using Eqs. (32) and (33), to give a converted solution vector $[û]$. Then, in block 612, the inverse normalized discrete Fourier transform is applied to the converted solution vector $[û]$ from block 610. Either inverse transform method yields the least squares solution vector û(t).

Thus the preferred method of the present invention describes a method for converting a rank deficient m×n convolutional least squares problem representing the inversion of a geophysical signal into a full-rank q×r system, where q<m and r≦n. This is done by converting the problem into the Fourier or Hartley domain and then spectrally pruning rows and columns to obtain the final system. The method depends upon the fast Fourier transform to achieve the speed necessary to be competitive with traditional methods, but eliminates the need for computationally expensive method such as singular value decomposition to deal with rank deficiency. For the original m×n system with rank r<n, the approximate number of total multiply or add operations, neglecting higher order terms, are given by $$O_s=2n^2\cdot(2q+4n+r), \quad (34)$$

for the singular value decomposition method of the prior art and $$O_f=2q\cdot(n\cdot\log_2(n)+r^2) \quad (35)$$

for the fast Fourier transform method of the present invention. It can be seen that for r<<n, that the spectrally pruned fast Fourier transform method can give dramatic computational savings. Note that the total in Eq. (35) is based upon solving a q×r system using QR matrix decomposition with back substitution. If the number of equations themselves can be significantly reduced from m to q, then this approximation will allow a further reduction of calculations using either method.

Instead of using the Fourier transform for transforming the seismic data to a transform domain, another embodiment of the inventions use Haar transforms. Yet another embodiment of the invention uses the Haademard transform. These transforms are unitary transforms that would be known to those versed in the art. Yet another embodiment of the invention uses wavelet transforms. Wavelet transforms have the same structure as the Haar transform, but as shown by Yves Meyer, have the additional property that the corresponding expansion is differentiable term by term of the seismic trace is smooth. With any of these unitary transforms, the process of transformation, pruning, and solving the pruned equations may be carried out efficiently.

The present invention has been described with a certain degree of specificity. Variations will occur to those skilled in the art which are within the scope of the invention. All such variations are intended to be within the scope of the following claims.

What is claimed is:

1. A method for inverting a seismic signal comprising:

(a) acquiring an input seismic signal;

(b) representing the input seismic signal as an input vector i(t) of length m+n−1, an output seismic signal as an output vector o(t) of length m, and a finite impulse response filter as a solution vector u(t) of length n, satisfying a convolutional equation $$i(t) \otimes u(t) = o(t);$$

(c) calculating an m×n Toeplitz matrix T(t,τ) corresponding to i(t), satisfying a matrix equation $$T(t,\tau) \cdot u(t) = o(t);$$

(d) transforming both sides of the matrix equation to a transform domain, to generate a transformed equation;

(e) pruning both sides of the transformed equation, to generate a pruned equation; and (f) solving the pruned equation.

2. The method of claim 1, wherein the transform domain is a frequency domain and said transforming is done by applying a column-wise discrete Fourier transform to the Toeplitz matrix T (t, τ) and to the output vector o(t), generating the transformed equation $$\{T\} \cdot u = \{o\}.$$

3. The method of claim 1, wherein the transform domain is a frequency domain and said transforming is done by applying a column-wise discrete Hartley transform to the Toeplitz matrix T(t,τ) and to the output vector o(t), generating the transformed equaton $$[T] u = [o].$$

4. The method of claim 2, wherein said pruning is applied to rows of the both sides of the transformed equations, generating the pruned equation $$\{T^-\} \cdot u = \{o^-\}.$$

5. The method of claim 3, wherein said pruning is applied to rows of the both sides of the transformed equations, generating the pruned equation $$[T^-] u = [o^-].$$

6. The method of claim 1, wherein solving the pruned equation further comprises the steps of:

(i) performing a QR decomposition to generate a decomposed equation; and (ii) solving the decomposed equation by back substitution.

7. The method of claim 6 wherein the QR decomposition is performed on a normal form of the pruned equation.

8. The method of claim 1, wherein solving the pruned equation further comprises a process including a singular value decomposition.

9. The method of claim 8, wherein solving the pruned equation further comprises converting the pruned equation to a normal form equation prior to the singular value decomposition.

10. The method of claim 4, wherein solving the pruned equation further comprises:

(i) applying a second transform to the pruned equation, to generate a doubly-transformed equation;

(ii) pruning the doubly-transformed equation, to generate a doubly-pruned equation; and (iii) solving the doubly-pruned equation.

11. The method of claim 10, wherein applying a second transform is done by applying a row-wise discrete Fourier transform to a pruned, transformed Toeplitz matrix $\{T^-\}$ and a column-wise discrete Hartley transform to the filter vector u(t), generating the doubly-transformed equation $$\{\{T^-\}^H\}^H \cdot \{u\} = \{o^-\}.$$

12. The method of claim 5, wherein transforming the pruned equation further comprises:

(i) applying a second transform to the pruned equation to generate a doubly transformed equation;

(ii) pruning the doubly transformed equation to generate a doubly pruned equation; and (iii) solving the doubly pruned equation.

13. The method of claim 12, wherein applying a second transform is done by applying a row-wise discrete Fourier transform to the pruned, transformed Toeplitz matrix $[T^-]$ and a column-wise discrete Hartley transform to the filter vector u(t), generating the doubly-transformed equation $$\{[T^-]^H\}^H \cdot \{u\} = [o^-].$$

14. The method of claim 11, wherein said spectrally pruning of the doubly-transformed matrix equation is applied to columns of the both sides of the transformed equations, generating the doubly pruned equation $$\{\{T^-\}^{H-}\}^H \cdot \{u^-\} = \{o^-\}.$$

15. The method of claim 13, wherein said spectrally pruning of the doubly-transformed matrix equation is applied to columns of the both sides of the transformed equations, generating the doubly pruned equation $$\{[T^-]^{H-}\}^H \cdot \{u^-\} = [o^-].$$

16. The method of claim 10, wherein solving the doubly pruned equation further comprises:

(i) performing a QR decomposition to generate a decomposed equation;

(ii) solving the decomposed equation by back substitution, to generate a pruned solution vector $\{u^-\}$;

(iii) filling in the pruned coefficients in the pruned solution vector $\{u^-\}$ with zeros, to generate a filled-in vector $\{\hat{u}\}$; and (iv) applying an inverse discrete Fourier transform to the filled in vector $\{\hat{u}\}$.

17. The method of claim 16 wherein the QR decomposition is performed on a normal form equation of the doubly pruned equation.

18. The method of claim 12, wherein solving the doubly pruned equation further comprises:
  (i) performing a QR decomposition to generate a decomposed equation;
  (ii) solving the decomposed equation by back substitution, to generate a pruned solution vector $[u^-]$;
  (iii) filling in the pruned coefficients in the pruned solution vector $[u^-]$ with zeros, to generate a filled-in vector $[û]$; and
  (iv) applying an inverse discrete Hartley transform to the filled-in vector $[û]$.

19. The method of claim 18 wherein the QR decomposition is applied to a normal form of the doubly pruned equation.

20. The method of claim 10, wherein the step of solving the doubly pruned equation further comprises:
  (i) performing a QR decomposition to generate a decomposed equation;
  (ii) solving the decomposed equation by back substitution, to generate a pruned solution vector $[u^-]$;
  (iii) filling in the pruned coefficients in the pruned solution vector $[u^-]$ with zeros, to generate a filled-in vector $[û]$;
  (iv) converting the filled-in vector $[û]$ from the Hartley to the Fourier domain, to generate a converted vector $\{û\}$; and
  (v) applying an inverse discrete Fourier transform to the converted vector $\{û\}$.

21. The method of claim 20 wherein the QR decomposition is applied to a normal form of the doubly pruned equation.

* * * * *